(12) United States Patent
Harel et al.

(10) Patent No.: US 7,653,616 B2
(45) Date of Patent: Jan. 26, 2010

(54) SOURCE AND DESTINATION DETERMINATION SYSTEM AND METHOD

(75) Inventors: Orit Harel, Kadima (IL); Ohad Navon, Kiryat Tivon (IL); Malkiel Hadari, Hod Hasharon (IL)

(73) Assignee: SAP AG, Walldorf (DE)

( * ) Notice: Subject to any disclaimer, the term of this patent is extended or adjusted under 35 U.S.C. 154(b) by 298 days.

(21) Appl. No.: 11/322,485

(22) Filed: Dec. 30, 2005

(65) Prior Publication Data

US 2007/0162429 A1 Jul. 12, 2007

(51) Int. Cl.
G06G 1/14 (2006.01)
G06Q 20/00 (2006.01)
G06Q 10/00 (2006.01)
G06F 7/00 (2006.01)
G06F 17/30 (2006.01)

(52) U.S. Cl. ............................ 707/3; 705/22; 705/28; 707/104.1

(58) Field of Classification Search ................ 705/22, 705/28; 707/104.1, 3
See application file for complete search history.

(56) References Cited

U.S. PATENT DOCUMENTS

| 4,783,740 | A | | 11/1988 | Ishizawa et al. | |
|---|---|---|---|---|---|
| 5,666,493 | A | * | 9/1997 | Wojcik et al. | 705/26 |
| 5,936,860 | A | | 8/1999 | Arnold et al. | |
| 5,987,423 | A | | 11/1999 | Arnold et al. | |
| 6,006,196 | A | | 12/1999 | Feigin et al. | |
| 6,026,378 | A | * | 2/2000 | Onozaki | 705/28 |
| 6,341,269 | B1 | | 1/2002 | Dulaney et al. | |
| 6,549,891 | B1 | | 4/2003 | Rauber et al. | |
| 6,681,990 | B2 | | 1/2004 | Vogler et al. | |
| 6,744,436 | B1 | | 6/2004 | Chirieleison, Jr. et al. | |
| 6,799,671 | B1 | | 10/2004 | Gomez | |
| 6,961,709 | B2 | | 11/2005 | Goodwin, III | |
| 6,970,768 | B2 | | 11/2005 | Chien | |
| 2002/0188527 | A1 | * | 12/2002 | Dillard et al. | 705/27 |
| 2003/0046173 | A1 | * | 3/2003 | Benjier et al. | 705/26 |
| 2003/0204480 | A1 | * | 10/2003 | Heinrichs et al. | 707/1 |
| 2004/0015408 | A1 | * | 1/2004 | Rauen et al. | 705/26 |
| 2004/0199545 | A1 | * | 10/2004 | Wagner et al. | 707/104.1 |
| 2005/0284934 | A1 | * | 12/2005 | Ernesti et al. | 235/385 |

* cited by examiner

Primary Examiner—Hosain T Alam
Assistant Examiner—Van H Ngo
(74) Attorney, Agent, or Firm—Fish & Richardson P.C.

(57) ABSTRACT

In a first general aspect, a computer program product tangibly embodied in an information carrier is described. The computer program product includes instructions that, when executed, perform operations for identifying a source or destination for stock. The operations include receiving an electronic request to determine a source or destination for stock, identifying, using a primary rule, a logistic area database object that represents a storage location at one of multiple levels of a hierarchy of storage locations. The logistic area database object is associated with a value that indicates an amount of stock that is associated with the storage location. The operations also include transmitting an identifier specifying the logistic area database object if the value indicates that associated storage location is available as a source or destination. The identifier is used to assign the storage location as the source or destination for the stock.

20 Claims, 5 Drawing Sheets

SOURCE AND DESTINATION DETERMINATION SYSTEM AND METHOD

TECHNICAL FIELD

This application relates to a source and destination determination system and method.

BACKGROUND

As logistic environments, such as warehouses, become larger, management of these environments has become increasingly complex. Current systems can model the logistic environments with software to enable human managers to control execution and planning of the environments. For example, some software models may provide warehouse workers with instructions regarding where to move incoming stock based on the model's knowledge of what locations can store the stock.

Managing stock allocation for storage locations can be a function incorporated into some current software systems. Some systems allocate stock at the most basic unit of the logistic environment. For example, the system can allocate stock to be stored or removed from bins, if the bin is the most basic unit of storage for the warehouse.

Additionally, some current software systems are designed only for allocating stock in warehouse logistic environments. In these systems, the locations that are allocated can be limited to physical storage space within the warehouse, such as bins. Also, the bins can be assigned to a particular product. When that bin runs out of the product, it can remain empty for a period of time until another shipment of that product arrives.

SUMMARY

The present application relates to a system and method for determining a source or destination for stock in a logistic environment.

In a first general aspect, a computer program product tangibly embodied in an information carrier is described. The computer program product includes instructions that, when executed, perform operations for identifying a source or destination for stock. The operations include receiving an electronic request to determine a source or destination for stock, identifying, using a primary rule, a logistic area database object that represents a storage location at one of multiple levels of a hierarchy of storage locations. The logistic area database object is associated with a value that indicates an amount of stock that is associated with the storage location. The operations also include transmitting an identifier specifying the logistic area database object if the value indicates that associated storage location is available as a source or destination. The identifier is used to assign the storage location as the source or destination for the stock.

In selected embodiments, the request to determine the source or destination for the stock may include a request to allocate the stock to or from the location. The primary rule may include sequences that specify an order of categories to be searched. The categories may include logistic area database objects, processing methods that are associated with and define storage characteristics for the logistic area database objects, or electronic documents that include information about deliveries or orders for the stock. The operations may further include matching a delivery of incoming stock with an order for outgoing stock.

Additionally, the operations can further include identifying a second logistic area database object that is at a level in the hierarchy logically below the first identified logistic area database object. The operations can further include determining if a storage location associated with the second logistic area database object is available for allocation and if so transmitting a second identifier specifying the second logistic area database object.

The operations can further include dynamically assigning an association between a material of the stock for which the source or destination has been requested and the identified logistic area database object wherein the identified logistic area database object is not assigned to any material. Furthermore, the operations can further include selecting one logistic area database object over another logistic area database object based on local rules associated with the identified logistic area database object. The local rules can specify characteristics for the storage location.

In other embodiments, the operations can further include applying at least one refinement rule to identify a single logistic area database object if the primary rule identifies more than one logistic area database object. The operations can further include using the identified logistic area database object in a planning module. The amount of stock associated with the storage location can be based on expected stock deliveries or orders. The operations can further include using the identified logistic area database object in an execution module. The amount of stock associated with the storage location can be based on current stock deliveries or orders. The storage location may include physical areas that store stock, resources that transport stock, or production machinery that modifies stock.

In still other embodiments, the storage location can be available as the destination if the storage location includes space for storing the stock or the location is available as the source if the stock available for retrieval. The space for storing the stock or the stock available for retrieval can be available in the future. The operations can further include determining from a set of primary rules which primary rule is to be used to identify the logistic area database object. Determining which primary rule to be used can be based on a material category associated with the stock or a logistic unit associated with the stock, wherein the logistic unit includes a set of attributes that define the stock.

In a second general aspect, a source and destination determination system for identifying a storage location as a source or destination for stock is described. It includes an interface that receives an electronic request for a storage location for stock to be placed or retrieved and a filter that searches categories related to storage locations and returns at least one identifier for a storage location. The storage location is one of multiple levels of a hierarchy of storage locations. The system also includes an availability checker that transmits a request to determine if the storage location is available for stock to be placed or retrieved and transmits the identifier for the storage location if it is available.

In some embodiments, the categories can be selected from a group consisting of logistic area database objects that represent the storage locations for stock, storage behavior methods that are associated with and define storage characteristics for the logistic area database objects, and electronic documents that include information about deliveries or orders for the stock.

Advantages of the systems and techniques described herein may include any or all of the following: improving the flexibility of allocation for different purposes, which represent the different stages of the process (e.g. planning, execution), by facilitating allocation on multiple levels of a hierarchy of storage locations; enabling different types of allocations (e.g. immediate, expected); increasing the power and flexibility of searching for locations for source or destination with or without allocation using sequences not only of locations but also of storage behavior methods and documents; enabling a refining approach to determine the preferred source or destination where multiple valid options exist; increasing simplicity of design and maintenance with use of a single allocation structure for warehouse and production logistic environments; and increasing efficiency by dynamically assigning storage locations to products.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
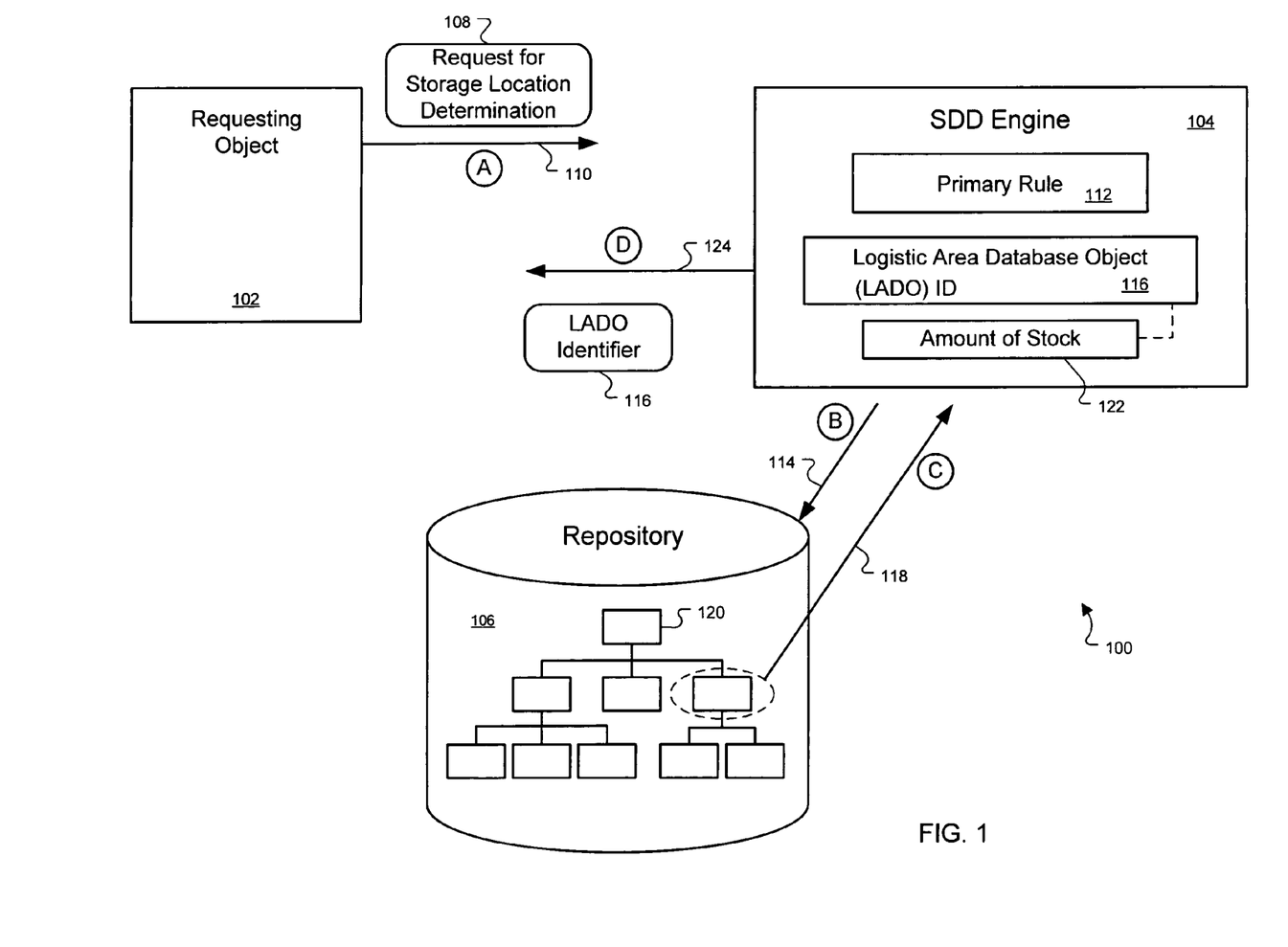
FIG. 1 is block diagram of a system for identifying a location to place or retrieve stock according to one implementation.

A system 100 of FIG. 1 may receive a request to determine a location for stock placement or for stock retrieval. The system 100 can then determine, based on a set of rules, whether source or destination determination is required. If determination is required, the system may use a sequence of locations to identify at which hierarchy level (e.g. site, area, bin) the system should search. The location returned may be a general location instead of a specific one. For example, the system 100 may determine that an Aisle A is an appropriate place to store incoming stock, and any bin on Aisle A may be selected to hold the stock. In this case, an identifier associated with the location Aisle A is returned instead of returning an identifier for a particular bin. Similarly, the system 100 may receive a request to allocate stock to or from a location. In this case, the source or destination may be determined and then stock may be allocated to or from the determined location.

More specifically, FIG. 1 is block diagram of the system 100 for identifying a location to place or retrieve stock according to one implementation. The system 100 can include a requesting object 102, a Source and Destination Determination (SDD) engine 104, and a data repository 106. The requesting, or calling, object 102 transmits a request 108 for storage location determination to the SDD engine 104, as indicated by an arrow 110. The SDD engine 104 uses a primary rule 112 to search a hierarchy in the repository 106 for a location to store or retrieve stock, as indicated by an arrow 114. The hierarchy here represents a location hierarchy, where each node can represent a different location level, such as an entire warehouse site, an aisle, or a bin in a warehouse. Other hierarchies, such as an inventory hierarchy can reside in the repository as well. The inventory hierarchy can be made up of nodes in a structure that mirrors the location hierarchy and can include an amount of stock for each corresponding node in the location hierarchy.

The SDD engine 104 can receive an identifier 116 associated with the location (shown by an arrow 118), and determine whether the location is available to store or retrieve stock.

The repository 106 can hold logistic area database objects (LADOs) that represent physical storage locations in a logistic environment, such as a warehouse or production environments. The LADOs can be logically organized in a tree structure as represented by the location hierarchy. Nodes near the root of the tree, or at a higher level of the tree, may represent greater logical groupings of storage locations. For example, the root node of the tree may represent an entire warehouse, the root's children nodes can represent the aisles in the warehouse, and the lowest leaves in the tree can be individual bins in each of the respective aisles.

A LADO level can be specified in the query for a location transmitted by the SDD engine, and the search for a location can include only LADOs at the specified level. Alternatively, the level can be determined by the SDD engine based on factors, such as the request purpose (e.g., the request is for planning purposes or execution purposes) included in the request. After at least one LADO is identified as a match, the SDD engine receives the associated LADO identifier 116 as described above in association with the arrow 118.

The SDD engine 104 can determine whether the location associated with the LADO ID 116 is available by accessing an amount of stock value 122 that is associated with the LADO ID. For example, if the request for stock determination includes a request to allocate space for incoming stock, the SDD engine can use the stock value 122 to determine if there is enough room at the location for the incoming stock. Similarly, if the request includes a request to allocate stock from that location for an out-going shipment order, the SDD engine can use the stock value 122 to determine if there is enough of the specified stock to fulfill the shipment order.

If the location has either enough space or stock to satisfy the request for the storage location determination 108, the SDD engine 104 can transmit the LADO identifier associated with the location to the requesting object 102 that called the SDD engine, as indicated by an arrow 124.

In another implementation, the SDD engine does not transmit the LADO identifier of an available location if other constraints associated with the location indicated that stock should not be removed from or placed at the location. For example, the available LADO can be associated with a constraint, such as an inventory block. The location can have space available for placing the stock, but the inventory block informs the system that no incoming stock may be placed at the location until a physical count of inventory is performed on the stock at the location. In this implementation, the system will not place the stock at the location despite its availability. Instead, the SDD determines and transmits a LADO ID for a location that is both available and not constrained.

FIG. 1 shows the arrows 110, 114, 118, and 124 labeled with letters A-D, respectively. The lettering indicates an order of action for the system 100 according to one implementation. For example, the first action shown is the transmission of the request 108 for storage location determination and the last action is the transmission of the LADO identifier 116, which corresponds to the location where the stock may be allocated.

Figure 2:
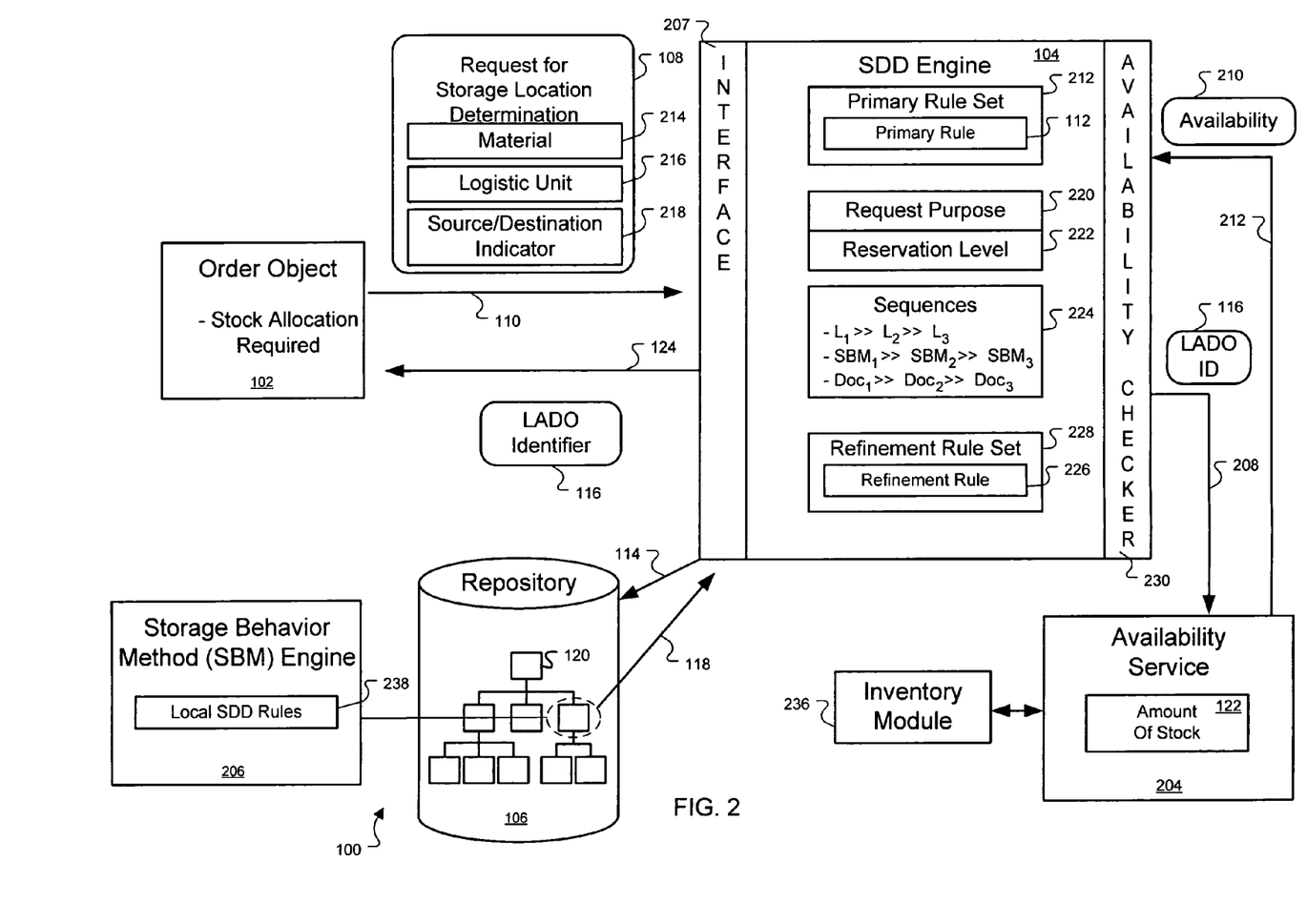
FIG. 2 is a more detailed block diagram of the system of FIG. 1 according to one implementation.

FIG. 2 is a more detailed block diagram of the system 100 of FIG. 1 according to one implementation. The system 100 shown in FIG. 2 includes the requesting object 102, the SDD engine 104, the repository 106, an availability service 204, and a storage behavior method (SBM) object 206. The requesting object 102, which can be an order object that includes information that goods need to be stored, transmits the request 108 for storage location determination to the SDD engine 104. The SDD engine can receive the request 108 through an interface 207 and use rules to query the repository 106, which returns the LADO ID 116, which is associated with a location for storing the stock, in response. The SDD engine 104, then can transmit a request including the LADO ID 116 (as shown by an arrow 208) to the availability service 204, which determines if the location associated with the LADO ID is available for allocation.

In other implementations, the SDD engine 104 uses a primary rule that defines a search sequence to follow when searching locations. After the search scope is defined, the SDD can access an inventory object to determine what stock is placed in the locations and uses this information along with the SDD rules to determine a source or destination.

After this determination, the availability service returns an availability indicator 210, as shown by an arrow 212. If the location is available, the SDD engine 104 can request to allocate this location for the order object 102 and then transmit the associated LADO ID or IDs 116 to the order object 102 that requested the stock allocation.

The step of checking for availability of a location, however, may be optional. The SDD is not limited to making the determination based on the availability of the location, but can consider the constraints stored in the repository for the location. For example, a LADO for a fixed bin may specify that all cell phones must retrieved from that bin regardless of whether there are available cell phones in the bin or not (e.g., the bin may be over-allocated). Also, the SDD can use both the constraints and the availability of the location to determine a source or destination.

Although not shown, the order object 102 may be used to generate instructions to place the stock at the location associated with the LADO ID. For example, other components included in the execution module 202 may generate instructions and transmit them to a human worker's computer. The worker may read the instructions and transport the stock specified in the order to the location associated with the LADO ID 116.

The requesting object 102 may be used in a planning stage instead of an execution stage. Used in this stage, the SDD engine can provide a high-level check of a stock or space availability using the location hierarchy 120. For example, the requesting object 102 may transmit information that stock allocation is required tomorrow for a particular stock. The SDD engine can provide a high-level check indicating that there is stock available somewhere in the warehouse (e.g., at a site level). The SDD engine does not have to determine whether lower levels, such as aisle and bin levels, are available as sources.

When the request 108 for storage location determination is received, the SDD engine 104 may access information contained in the request, such as a material 214 (e.g., Motorola V66 cell phone) of the stock, a logistic unit designation 216 associated with stock, and a source/destination indicator 218. The material 214 may identify the particular type of stock (e.g., cell phones, tires, bottled drinks, etc.). The logistic unit designation 216 can identify a logistic unit associated with the stock. The logistic unit can be a generic, or abstracted, representation of the stock, and may include all of the stock's attributes necessary for handling the stock; however, attributes not necessary for handling the stock, such as the stock's color, can be excluded from the properties of the logistic unit. The source/destination indicator 218 can indicate whether the stock allocation is for a source (i.e., an allocation of stock is requested from a location) or for a destination (i.e., allocation of space at a location is requested for storing stock).

The SDD engine 104 can include a primary rule set 212, which contains primary rules that are used to retrieve a location for stock allocation. The SDD engine 104 may select a particular primary rule, such as the rule 112, using the material 214 and the logistic unit designator 216 included in the request 108. For example, cell phones (e.g., the material) may be associated with one primary rule, while cases of beer (e.g., the logistic unit "CASE") can be associated with another primary rule. The request for storage location determination 108 can also include a source/destination indicator 218. The SDD engine 104 can use the indicator 218 to select a primary rule from the primary rule set 212.

The selected primary rule 112 can access several pieces of information for use in filtering appropriate locations for storing or retrieving stock. In one implementation, this information includes a request purpose 220, a reservation level 222, and one or more sequences 224. The primary rule 112 can use request purpose 220 to specify whether the stock allocation is made for planning purposes or execution purposes. This can affect whether current or future availability of the location is queried by the availability service, which is described in greater detail below. The primary rule 112 can use the reservation level 222 to specify a level in the hierarchy from which to retrieve the location. For example, the reservation level 222 can be "aisle." The primary rule can use the "aisle" designation to query the repository only for "aisle" locations.

The sequences 224 can describe a search sequence the primary rule 112 follows if a location returned from the repository 106 is not available. The primary rule 112 can be associated with a logistic areas search sequence that searches the repository 106 for logistic areas that meet the criteria specified by the rule. For example, the search sequence can be L1>>L2>>L3, where "L" stands for logistic area and the ">>" symbol indicates that if L1 is not available, L2 is checked for availability, and if L2 is not available, L3 is checked.

The sequences can also designate an order that the primary rule searches locations by specifying storage behavior methods, which are associated with the locations, to search. A storage behavior method (SBM) can be associated with a LADO and can define storage behavior for the location that is represented by the LADO. For example, the SBM can specify that products must be retrieved from the location using a first in first out (FIFO) method. An SBM may represent several locations that share similar characteristics, such as the same material and bin size. For example, one SBM may represent one hundred 10×10 feet bins that can contain 2-liter soda bottles.

Additionally, the primary rule 112 can search locations by specifying a sequence of documents, which are associated with locations. A document can be an electronic representation of a "paper," such as a delivery notice that certain goods will be delivered or that certain goods will be ordered by a customer. The document sequence can specify an order for the primary rule to search the locations associated with the documents. For example, the primary rule can specify that all locations associated with order documents from FavoriteCustomer A will be searched first to determine if stock is available to meet its order. Additionally, the primary rule 112 may use sequences of mixed types, such as L>>SBM2>>Doc3.

In some implementations, the primary rule may perform "cross-docking" using the documents. Cross-docking occurs when deliveries specified by a first document are matched with orders for the same goods specified by a second document. In other words, the documents are used to match the goods which will be received in the future (supply) with the orders for those goods (demand). This can have the advantage that goods do not have to be stored in the logistic environment, such as a warehouse, but can simply be transferred from an arriving truck to a departing truck.

If the primary rules produce more than one LODA match from the repository 106, one or more rules, such as a refinement rule 226, from a refinement rule set 228 may be used to narrow the list of possible locations for storage location determination. The refinement rules can be associated with the primary rules, so that results produced from a particular primary rule may then be refined with a refinement rule that corresponds with the primary rule. In one implementation, if two LODA IDs 116a, 116b are returned as a result of the primary rule's filtering, the refinement rule 226 can select one of the LODA IDs based on the location which is preferred in a sequence defined in the refinement rule. For example, if the request is for a stock allocation for a customer order and the SDD receives IDs associated with two bins that contain the same product, then the refinement rule 228 may select the ID associated with the bin that is closer to the truck loading dock so that the time required to move the stock from the bin to the loading dock is minimized.

The SDD engine 104 can also include an availability checker 230 that makes a call to the availability service 204. The call may pass the LADO ID 116, which the availability service uses to determine if the location is available for stock allocation. To make this determination, the availability service 204 can query an inventory module 236. The inventory module 236 can return information about stock allocations for the location associated with the LADO ID 116. For example, the module can return information about whether the location is reserved for incoming stock or whether stock at the location is reserved for orders. It also can return information about the current on-hand inventory at the location associated with the LADO ID 116. For example, the inventory module can return information about how much space is currently available at the location or how much stock at the location is currently allocated for orders.

The availability service 204 may also store information about expected incoming stock or expected stock reservation for future orders. Previous requests to the SDD engine may provide the availability service 204 with this information, which is stored and used to calculate an availability status, such as the current amount of stock summed with the expected amount of stock.

In one implementation, the availability service 204 can use the stored information and the information from the inventory module 236 to calculate an amount of stock value 122, which the engine can use to determine availability for the stock allocation. For example, if the request for stock allocation specifies that a hundred units of stock require storage immediately, the availability service can compare this requirement with the amount of space available at the location, which can be calculated by subtracting the amount of stock value 122 from the capacity of the location. In another example, if the request for stock allocation specifies that 100 units of stock require immediate delivery to Customer A, the availability service 204 can compare the amounts required to the amount of stock value 122 to determine if enough stock is available at that location. As a result of the availability determination, the availability service 204 can generate and transmit an availability status 210 that indicates whether the location associate with the LADO ID 116 is available.

In some implementations where several locations are available for stock allocation, the SDD engine 104 may utilize local SDD rules 238 in the SBM object 206 that is associated with the locations to refine which locations are returned. The local SDD rules 238 can define a strategy, such as retrieval and placement strategies, used within the location. For example, local SDD rules 238 can instruct the system to select the location that holds the oldest stock. The local SDD rules may be used by the SDD engine 104 in combination with the refinement rules 228.

The SDD engine may determine which SBM object 206 to access based on pointers associated with an object that is dependent on the LADO. For example, the LADO may have a dependent object that stores information about the location that the LADO represents. This information may include a pointer to the SBM object 206 associated with the LADO.

Figure 3:
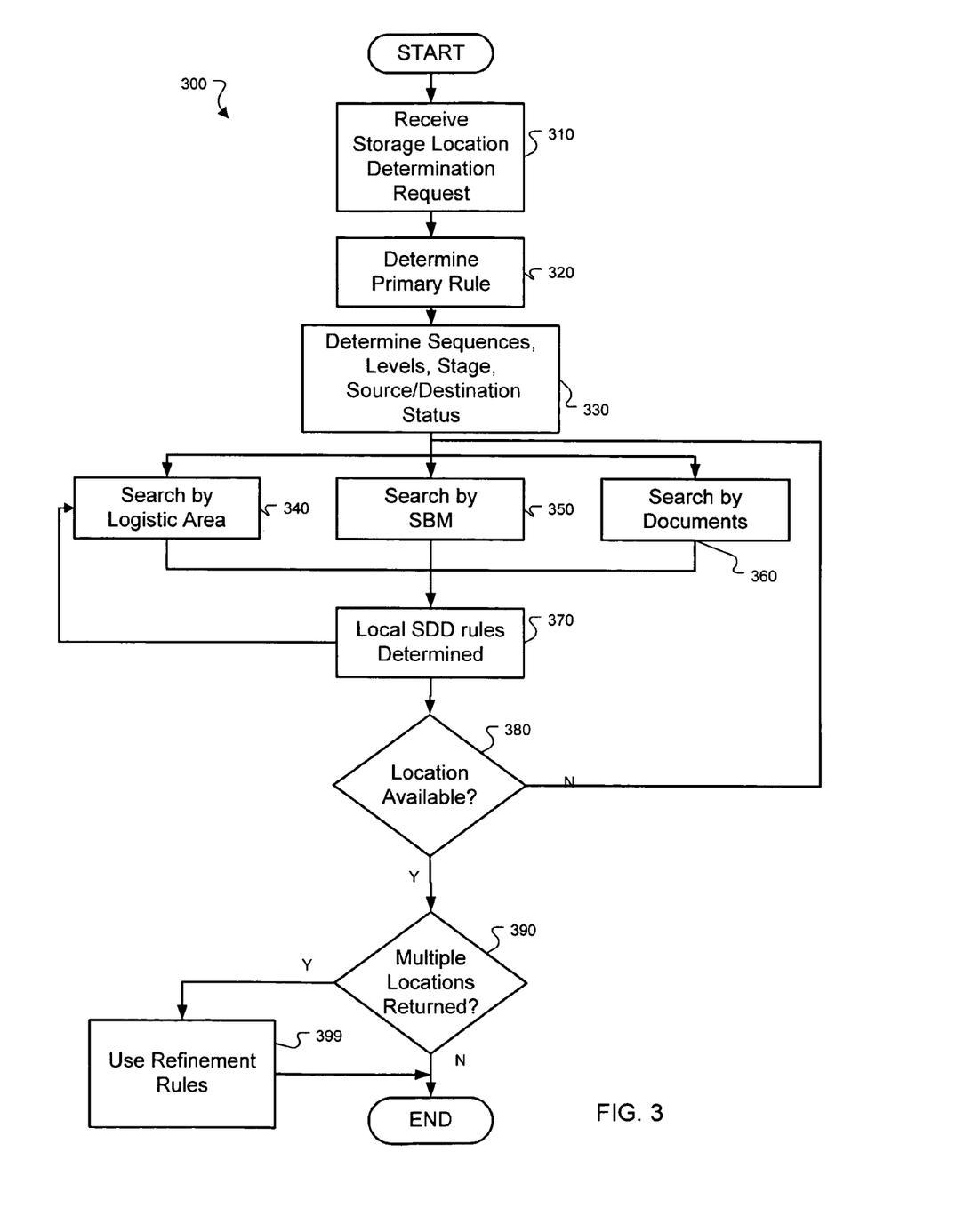
FIG. 3 is a flow chart for an exemplary method for identifying a location to place or retrieve stock.

FIG. 3 is a flow chart for an exemplary method 300 for identifying a location to place or retrieve stock. For example, a processor may execute instructions which perform the method 300. The method may start by performing step 310, in which a storage location determination request is received. For example, the requesting object 102 may transmit the request for storage location determination 108 to the SDD engine 104.

In step 320, a primary rule to ascertain a location for the storage location determination may be selected. For example, the SDD engine 104 may use the material 214 to select which primary rule to select from a primary rule set 212.

In step 330, the sequences, levels, request purposes, and source/destination status may be determined. For example, the SDD engine 104 may access the sequences 224 specified by the primary rule to determine what categories (e.g., locations, SBMs, docs) to search and in what order. Primary rules may use the request purpose 220 to specify a purpose, such as immediate execution, for which the stock will be used. Additionally, the rule may use of the reservation level 222 to specify a hierarchy level, such as "aisle," that will be used for stock allocation. The rule may use the level as filtering criteria when searching the repository 106.

Next, depending on the sequence specified, step 340, 350, or 360 can be performed. If the sequence specifies that the next locations to be searched are associated with a logistic area, step 340 is performed. For example, a LADO associated with a particular location, such as bin #2432, may be specified by the sequence as the first location to search. The ID associated with this LADO can be transmitted to the SDD engine and checked for availability.

If the sequence specifies that the primary rule should search by SBM, step 350 is performed. For example, the SBM object may contain storage behavior methods that apply to high racks in a warehouse. One SBM object can be linked to more than one location, such as high rack A, high rack B, and high rack C. In one implementation, the primary rule may search the SBM, which also can be stored in the repository 106. For example, the primary rule may implement the sequence $SBM_{HighRack} \gg SBM_{LowRack}$. The SDD can access the $SBM_{HighRack}$ to determine which LADOs are associated with that SMB. The LADO IDs may then be returned to the SDD engine 104.

If the sequence specifies that the primary rule should search by document, step 360 is performed. For example, the search sequence can instruct the primary rule to request documents from the Order module 232 for television sets delivered by customer BigSeller. If there are no deliveries from BigSeller, the primary rule may request documents that specify deliveries from SmallSeller. The document can specify what product will be delivered, and the system can associate a location with the product that will be delivered. For example, the television sets delivered by customer BigSeller may be delivered to an unloading dock, which has a LADO associated with it. An ID for this LADO can be returned to the SDD engine as a source for the television sets.

In step 370, the SDD engine can access local SDD rules associated with the returned LADO IDs and use the rules to filter the possible locations. For example, a local SDD rule may specify that the oldest stock should be allocated first.

In step 380, the location or locations identified by the local SDD rules are checked to see if the locations are available for stock allocation. For example, the SDD engine 104 may transmit the LADO ID 116 associated with the location to the availability service 204. The availability service 204 can generate and return the availability status 210 based on whether the location has enough space or stock to satisfy the storage location determination request 108. If the location is not available, the method 300 may return to step 340, step 350, or step 360. The method can return to the step that is specified by the sequence. For example, if the first category is a Logistic Area, and the associated location is unavailable, the SDD engine may search the repository based on a second category, such as SBM.

If the location is available, step 390 may be performed. In step 390 a determination can be performed based on whether multiple locations appropriate for stock allocation were returned. For example, if the SBM specified by the search sequence 224 is associated with more than one location, the SDD engine 104 may receive multiple LADO IDs. If multiple LADO IDs are received, step 399 may be performed. If the SDD engine 104 returns one LADO ID, the process may end.

In step 399, refinement rules in the SDD engine may be used to filter the multiple LADOs to a single LADO. For example, the SDD engine can use refinement rule 226 to filter the multiple locations to a single location. The refinement rule can be selected from a set of refinement rules 228 based on the primary rule that produced the multiple locations.

Figure 4:
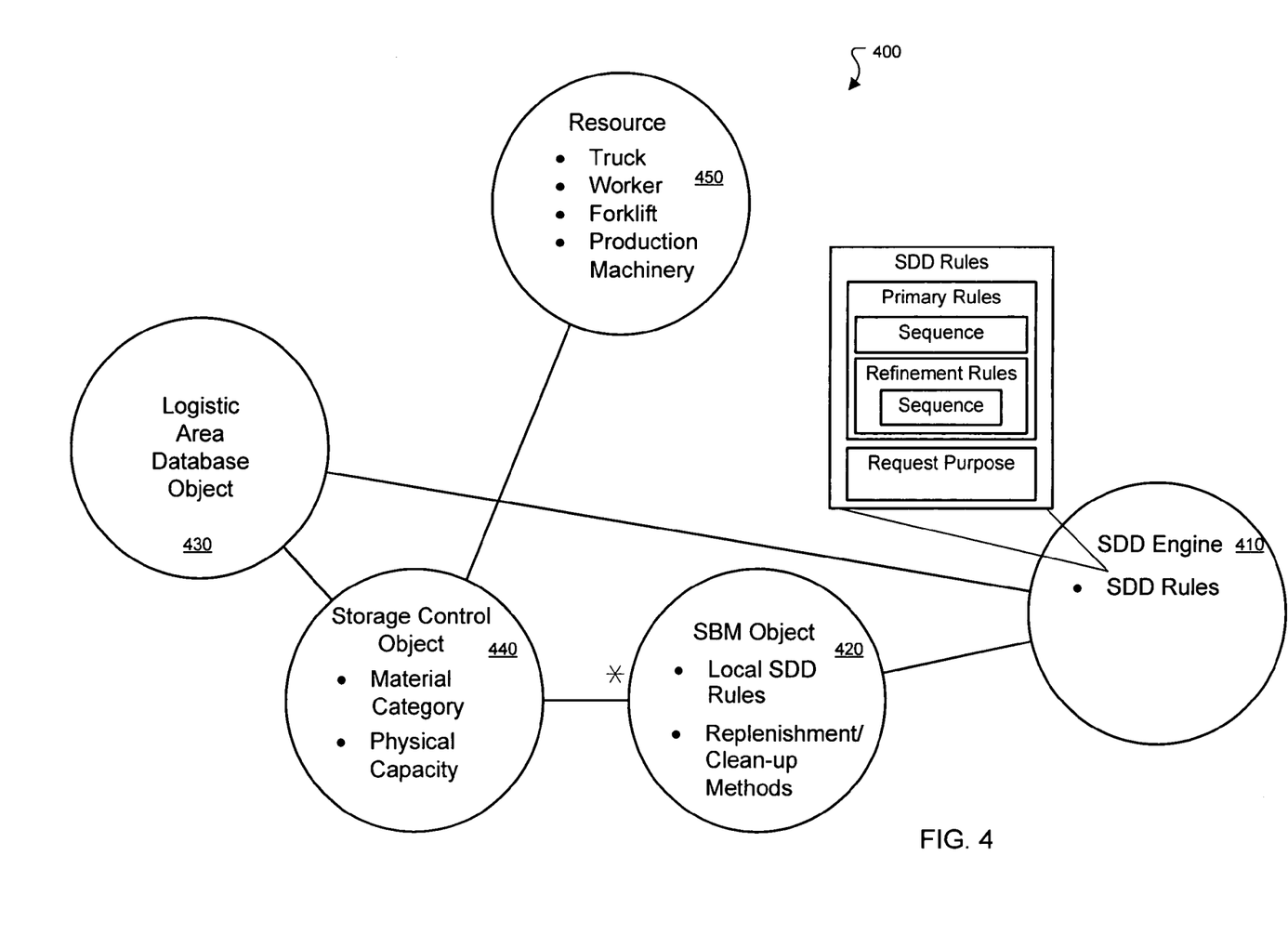
FIG. 4 is a relational diagram of objects used in the system of FIG. 2 according to one implementation.

FIG. 4 is a relational diagram 400 of objects used in the system 100 of FIG. 2 according to one implementation. The diagram 400 includes a SDD engine 410, a SBM object, a LADO 430, a storage control object 440, and a resource object 450. FIG. 4 illustrates that the SDD engine may search the objects LADO 430 and SBM object 430. For example, the SDD engine may use the sequences 224 to determine which objects should be searched.

When the SBM object 420 is searched, the associated LADO can be accessed by using the SBM to access the storage control object 440, and then using a reference that associates the storage control object 440 with the LADO to access the LADO 430. In some implementations, the storage control object 440 stores characteristics related to the location represented by the LADO. For example, the storage control object 440 may include material categories that specify what type of material can be stored at the location, such as only tooth brushes or only tooth brushes and tongue scrapers. As another example, the storage control object 440 may include the physical capacity of the associated location (e.g., the location can only contain 50 units of stock X).

The SBM object may include replenishment and clean-up rules that apply to the location. The replenishment rule can be triggered when a storage location is "starved for," or needs more, stock. This may be determined by comparing a replenishment threshold with a quantity of stock associated with the location. The clean-up rule can be triggered when stock should be removed from a storage location, such as when the storage location has too much stock. Similarly, clean-up can be triggered by comparing a clean-up threshold with the quantity of stock.

In some implementations, the current and expected stock for the storage location may be compared to the threshold. If the threshold is crossed, the storage control object may initiate an action that requests the SDD engine to allocate stock for the location. For example, the storage control object 430 may access the SBM object, which contains methods for a type of locations, such as a high rack type. In the case of replenishment, the storage control object can access the replenishment method, which includes the replenishment threshold, to determine if the location associated with the storage object requires more stock.

More than one storage control object 440 can be associated with the same SBM, as indicated by an asterisk above the link connecting the storage control object 440 and the SBM object 420. This may cause the SDD engine to receive multiple location matches when searching for a location by SBM. In that case, the SDD engine 410 may use the primary rules, the refinement rules, the sequences, and the request purpose to filter the results as described in association with FIGS. 2 and 3.

Resources may also be associated with the storage control object. The storage control object can include characteristics about the resource, such as the type of material it accepts. Resources can include machines and people that manipulate stock, such as trucks that move it to the logistic environment, workers that pick it from storage areas, forklifts that move it internally within the warehouse, and production machines that assemble, paint, or otherwise modify it.

A resource can be considered a storage location in a similar way that a physical storage area, such as a bin or aisle, is considered a storage location. The SDD engine 410 may access and return resource IDs that specify a resource from which to retrieve or add stock. For example, if the SDD engine searches using SBM sequences, it can then access the storage control object associated with the selected SBM. The resource 450 can be associated with the storage control object in a similar manner to the way that the LADO is associated with the storage control object, and thus, the SDD engine can retrieve a resource ID that the engine 410 can use for allocation of stock to or from the identified resource.

Figure 5:
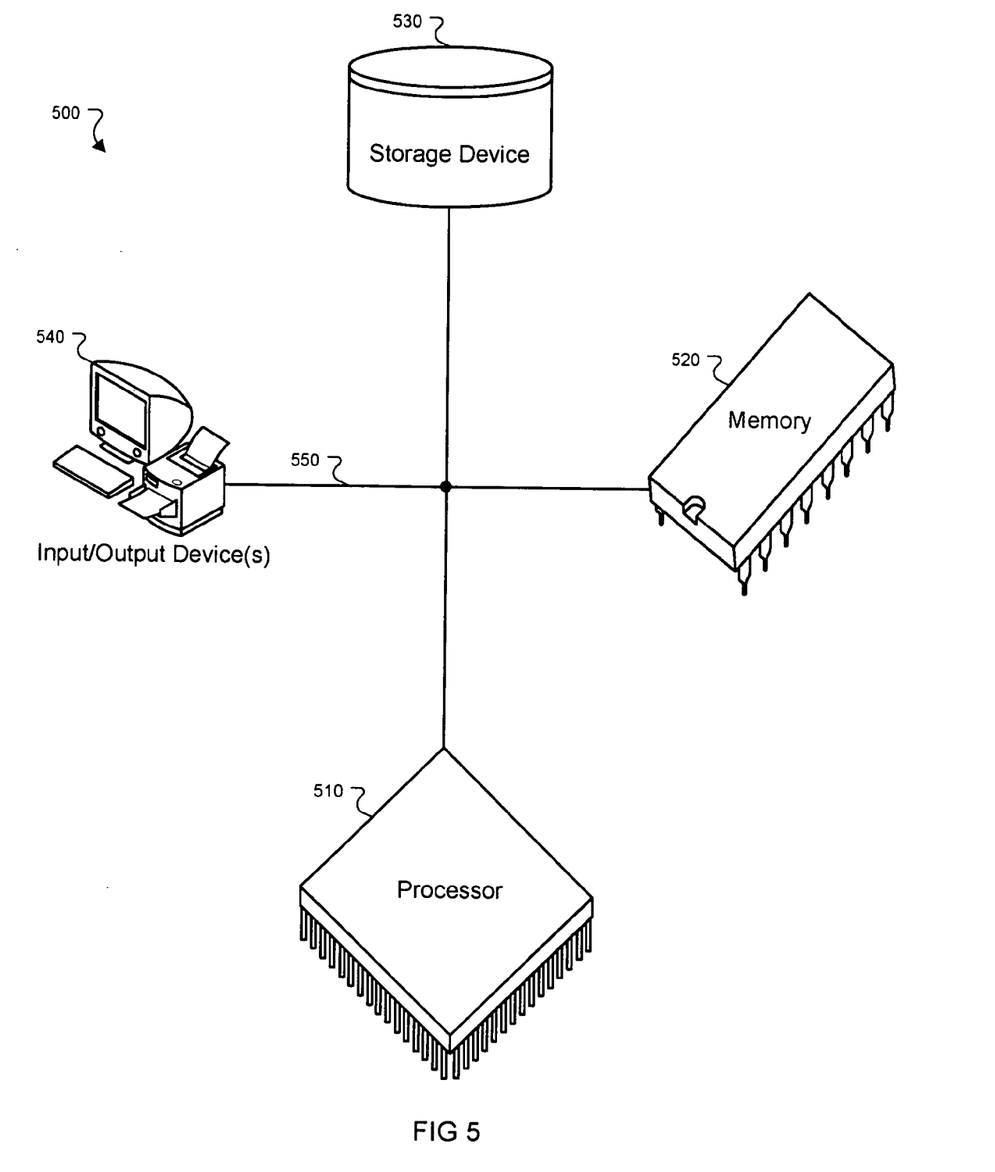
FIG. 5 is a schematic diagram of a general computing system.

FIG. 5 is a schematic diagram of a general computing system. The system 500 can be used in the method 300 and can be used to implement one or more components of the system 100, described above, according to one implementation. For example, the system 500 may implement the repository 106 and a separate system, similar to system 500, may implement the SDD engine 104.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface, such as an interface that displays planning or execution information to a manger, on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 100. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them.

The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of the embodiments. For example, the SDD engine may receive a LADO ID associated with a relatively higher location level, such as an aisle. Once this higher level LADO ID is determined, the SDD engine may determine a lower location level, such as a bin within the aisle. This determination of the lower level may be similar to the method 400, where a sequence of bins is specified and the SDD uses a primary rule to determine which bins are available for the allocation. The SDD engine can receive A LADO ID associated with an available lower location level and transmit it to the requesting object 102 instead of or in addition to the LADO ID associated with the higher level. For example, the SDD may search at the aisle level and then at the bin level once an aisle is located. The SDD engine can then return The LADO ID associated with the bin to the requesting object instead of the LADO ID associated with the aisle.

In another implementation, only the LADO ID associated with the higher level location is transmitted to the requesting object. In this case, the stock may be taken from or put in any of the lower level locations that are logically included in the higher level location. For example, if Aisle A is returned, then the incoming stock can be stored in any bin in Aisle A.

In yet another implementation, other objects besides the location hierarchy 120 can be stored in the repository 106. For example, the LADO, the SBM, the storage control object, and the primary rules can be static data stored in the repository. Other elements, such as the SDD engine and the availability service can be dynamic objects that are not stored in the repository, but access the objects in the repository to perform actions.

In other implementations, the system may dynamically assign an association between a bin and a type of stock. A bin can initially be a fixed bin that is associated with a specified type of material, such as desk lamps. When more desk lamps arrive, the SDD engine determines that the lamps should be stored in that fixed bin. When the lamps are removed from the bin, the SDD engine may dynamically reassign the fixed bin to store a different type of stock, such as flashlights.

Dynamic fixed bin assignment can work in concert with allocation at a higher level. For example, the SDD engine may assign stock to an abstracted level, such as an aisle. In this case, it may not be important what bin it is assigned to as long as the stock is located on that aisle. The SDD engine may assign any empty bin to the incoming stock material type, and in the future if more stock arrives of the same material type, it may be placed in the same bin because the SDD engine associated the bin with the material type. In one implementation, the SDD initiates a modification of data stored in the repository, such as a material category associated with a storage control object associated with the bin.

The determination of source and destination locations can also be bounded or influenced by requirements set by the requesting object. For example, a hierarchal level or a type of storage location (e.g., unloading dock) can be specified by the object requesting a source or destination determination. This may work in cooperation with or supersede the determination which would have been produced by the primary or refinement rules of the SDD.

In addition, the sequences 224 can be based on several types of information, such as the level of abstraction. For example, a sequence may specify that the SDD engine first search BIN1, and if that is not available, then search Aisle4. Accordingly, other embodiments are within the scope of the following claims.

What is claimed is:

1. A computer program product tangibly embodied in a machine-readable storage device, the computer program product including instructions that, when executed, perform operations for identifying a source or destination for stock, the operations comprising:
   receiving an electronic request to determine a source or destination for stock;
   accessing a software model of a facility comprising logistic area database objects that are configurable to represent storage locations at any one of a plurality of different levels of a hierarchy of storage locations and to represent an amount of stock stored at the storage locations;
   determining a level of the hierarchy of storage locations at which a logistic area database object will be identified as the source or destination for the stock, wherein the level is determined based upon whether a purpose associated with the received request is a planning purpose or an execution purpose;
   selecting a primary rule from a set of primary rules based upon the determined level of the hierarchy of storage locations and at least one of a material category associated with the stock and a logistic unit associated with the stock, wherein the logistic unit includes a set of attributes that define the stock wherein the selected primary rule includes at least one sequence specifying an order of categories to be searched, wherein the categories include logistic area database objects, processing methods that are associated with and define storage characteristics for the logistic area database objects, or electronic documents that include information about deliveries or orders for the stock;
   identifying, using the selected primary rule, at least one logistic area database object from the logistic area database objects representing the storage locations at the different levels of the hierarchy that is available as the source or destination for the stock; and
   assigning a storage location represented by the identified logistic area database object as the source or destination for the stock.

2. The computer program product of claim 1, wherein the request to determine the source or destination for the stock includes a request to allocate the stock to or from the location.

3. The computer program product of claim 1, wherein the primary rule includes sequences that specify an order of categories to be searched.

4. The computer program product of claim 3, wherein the categories include logistic area database objects, processing methods that are associated with and define storage characteristics for the logistic area database objects, or electronic documents that include information about deliveries or orders for the stock.

5. The computer program product of claim 4, wherein the operations further comprise matching a delivery of incoming stock with an order for outgoing stock.

6. The computer program product of claim 1, wherein the operations further comprise identifying a second logistic area database object that is at a level in the hierarchy logically below the first identified logistic area database object.

7. The computer program product of claim 6, wherein the operations further comprise determining if a storage location associated with the second logistic area database object is available for allocation and if so transmitting a second identifier specifying the second logistic area database object.

8. The computer program product of claim 1, wherein the operations further comprise dynamically assigning an association between a material of the stock for which the source or destination has been requested and the identified logistic area database object wherein the identified logistic area database object is not assigned to any material.

9. The computer program product of claim 1, wherein the operations further comprise selecting one logistic area database object over another logistic area database object based on local rules associated with the identified logistic area database object, wherein the local rules specify characteristics for the storage location.

10. The computer program product of claim 1, wherein the operations further comprise applying more than one refinement rule to identify a single logistic area database object if the primary rule identifies more than one logistic area database object.

11. The computer program product of claim 1, wherein the electronic request further comprises an expected stock delivery or order which initiates use of the identified logistic area database object in a planning stage, wherein the amount of stock associated with the storage location is based on expected stock deliveries or orders.

12. The computer program product of claim 1, wherein the electronic request further comprises an expected stock delivery or order which initiates use of the identified logistic area database object in an execution stage, wherein the amount of stock associated with the storage location is based on current stock deliveries or orders.

13. The computer program product of claim 1, wherein the storage location includes physical areas that store stock, resources that transport stock, or production machinery that modifies stock.

14. The computer program product of claim 1, wherein the storage location is available as the destination if the storage location includes space for storing the stock or the location is available as the source if the stock available for retrieval.

15. The computer program product of claim 14, wherein the space for storing the stock or the stock available for retrieval is available in the future.

16. A computer program product of claim 1, wherein the operations further comprise determining from a set of primary rules which primary rule is to be used to identify the logistic area database object.

17. The computer program product of claim 16, wherein determining which primary rule to be used is based on a material category associated with the stock or a logistic unit associated with the stock, wherein the logistic unit includes a set of attributes that define the stock.

18. A source and destination determination system for identifying a storage location as a source or destination for stock, having one or more computers comprising:
   an interface that receives an electronic request for a storage location for stock to be placed or retrieved;
   a software model of a facility comprising:
      logistic area database objects that are configurable to represent storage locations at any one of a plurality of different levels of a hierarchy of storage locations and to represent an amount of stock stored at the storage locations;

a hierarchy level determination engine that determines a level of the hierarchy of storage locations at which a logistic area database object will be identified as the source or destination for the stock, wherein the level is determined based upon whether a purpose associated with the received request is a planning purpose or an execution purpose;

a primary rule selection engine that selects a primary rule from a set of primary rules based upon the determined level of the hierarchy of storage locations and at least one of a material category associated with the stock and a logistic unit associated with the stock, wherein the logistic unit includes a set of attributes that define the stock, wherein the selected primary rule includes at least one sequence specifying an order of categories to be searched, wherein the categories include logistic area database objects, processing methods that are associated with and define storage characteristics for the logistic area database objects, or electronic documents that include information about deliveries or orders for the stock;

a filter that identifies, using the selected primary rule, at least one logistic area database object from the logistic area database objects representing the storage locations at different levels of the hierarchy that is available as a source or destination for the stock; and an availability checker that assigns a storage location represented by the identified logistic area database object as the source or destination for the stock.

19. The system of claim 18, wherein the categories are selected from a group consisting of the logistic area database objects that represent the storage locations for stock, storage behavior methods that are associated with and define storage characteristics for the logistic area database objects, and electronic documents that include information about deliveries or orders for the stock.

20. A method for identifying a storage location as a source or destination for stock, comprising:

receiving an electronic request to determine a source or destination for stock;

accessing a software model of a facility comprising logistic area database objects that are configurable to represent storage locations at any one of a plurality of different levels of a hierarchy of the storage locations and to represent an amount of stock stored at the storage locations;

determining a level of the hierarchy of storage locations at which a logistic area database object will be identified as the source or destination for the stock, wherein the level is determined based upon whether a purpose associated with the received request is a planning purpose or an execution purpose;

selecting a primary rule from a set of primary rules based upon the determined level of the hierarchy of storage locations and at least one of a material category associated with the stock and a logistic unit associated with the stock, wherein the logistic unit includes a set of attributes that define the stock, wherein the selected primary rule includes at least one sequence specifying an order of categories to be searched, wherein the categories include logistic area database objects, processing methods that are associated with and define storage characteristics for the logistic area database objects, or electronic documents that include information about deliveries or orders for the stock;

identifying, using the selected primary rule, at least one logistic area database object from the logistic area database objects representing the storage locations at the different levels of the hierarchy that is available as a source or destination for the stock; and assigning a storage location represented by the identified logistic area database object as the source or destination for the stock.

\* \* \* \* \*